US012640642B2

(12) United States Patent (10) Patent No.: US 12,640,642 B2
Hovsapian et al. (45) Date of Patent: May 26, 2026

(54) SUBMODULE FAULT TOLERANCE IN MODULAR MULTILEVEL CONVERTERS

(71) Applicants:Alliance Energy Innovation, LLC, Golden, CO (US); University of South Carolina, Columbia, SC (US)

(72) Inventors: ZohRob Hovsapian, Tallahassee, FL (US); Yashodhan Prakash Agalgaonkar, Lakewood, CO (US); Herbert L. Ginn, Columbia, SC (US); Dhiman Chowdhury, Columbia, SC (US)

(73) Assignees: Alliance for Energy Innovation, LLC, Golden, CO (US); University of South Carolina, Columbia, SC (US)

( * ) Notice: Subject to any disclaimer, the term of this patent is extended or adjusted under 35 U.S.C. 154(b) by 163 days.

(21) Appl. No.: 18/752,488

(22) Filed: Jun. 24, 2024

(65) Prior Publication Data

US 2025/0167667 A1 May 22, 2025

Related U.S. Application Data

(60) Provisional application No. 63/509,808, filed on Jun. 23, 2023.

(51) Int. Cl.
*H02M 1/08* (2006.01)
*H02M 1/32* (2007.01)
*H02M 7/483* (2007.01)

(52) U.S. Cl.
CPC ............. *H02M 1/325* (2021.05); *H02M 1/08* (2013.01); *H02M 7/4835* (2021.05)

(58) Field of Classification Search
CPC ....... H02M 1/325; H02M 7/4835; H02M 1/08
See application file for complete search history.

(56) References Cited

U.S. PATENT DOCUMENTS 10,734,804 B2 * 8/2020 Aramaki ................... H02J 1/00
11,336,169 B2 * 5/2022 Kajiyama ............. H02M 1/325
(Continued)

OTHER PUBLICATIONS

Farzamkia et al., "Improved Fault-Tolerant Method for Modular Multilevel Converters by Combined DC and Neutral-Shift Strategy", IEEE Transactions on Industrial Electronics, Mar. 2019, vol. 66, No. 3, pp. 2454-2462.
(Continued)

*Primary Examiner* — Adolf D Berhane
(74) *Attorney, Agent, or Firm* — Robert G. Pittelkow

(57) ABSTRACT

An example device includes at least one processor configured to receive an indication of a fault in submodules in a first arm of a first phase leg of a modular multilevel converter (MMC), cause it to bypass an equal number of healthy submodules in a second arm of the first phase leg, determine a zero-sequence voltage for each phase leg, and determine, for each phase leg, based at least in part on the zero-sequence voltage, a respective modified phase leg reference signal. The respective modified phase leg reference signal for the first phase leg may be determined further based in part on a reduced utilization factor for the first phase leg. The processor is further configured to determine, based on the respective modified phase leg reference signal for each phase leg, gate driver signals for submodules in the MMC and cause it to operate using the signals.

15 Claims, 10 Drawing Sheets

(56) References Cited

U.S. PATENT DOCUMENTS

| | | | |
|---|---|---|---|
| 12,413,156 B2 * | 9/2025 | Fujiwara | H02M 7/4835 |
| 12,463,551 B2 * | 11/2025 | Alvarez Valenzuela | |
| | | | H02M 1/0025 |
| 2026/0036644 A1 * | 2/2026 | Lee | G01R 31/40 |

OTHER PUBLICATIONS

Farzamkia et al., "Fault-Tolerant Method to Reduce Voltage Stress of Submodules in Postfault Condition for Regenerative MMC-Based Drive", IEEE Transactions on Industrial Electronics, Jun. 2021, vol. 68, No. 6, pp. 4718-4726.

Hammond et al., "Enhancing the reliability of modular medium-voltage drives", IEEE Transactions on Industrial Electronics, Oct. 2002, vol. 49, No. 5, pp. 948-954.

Hu et al., "Energy-balancing Control Strategy for Modular Multilevel Converters Under Submodule Fault Conditions", IEEE Transactions on Power Electronics, Sep. 2014, vol. 29, No. 9, p. 5021-5030.

Kucka et al., "Optimised operating range of modular multilevel converters for AC/AC conversion with failed modules", 2015 17th European Conference on Power Electronics and Applications (EPE'15 ECCE—Europe), pp. 1-10.

Kucka et al., "Enhancing the Reliability of Modular Multilevel Converters Using Neutral Shift", IEEE Transactions on Power Electronics, Dec. 2017, vol. 32, No. 12, pp. 8953-8957.

Li et al., "A zero-sequence voltage injection control scheme for modular multilevel converter under submodule failure", IEEE Energy Conversion Congress and Exposition (ECCE), 2016, pp. 1-6.

Li et al., "Fault-Tolerant Control of MMC With Hot Reserved Submodules Based on Carrier Phase Shift Modulation," IEEE Transactions on Power Electronics, Sep. 2017, vol. 32, No. 9, pp. 6778-6791.

Ojo, "The generalized discontinuous PWM scheme for three-phase voltage source inverters", IEEE Transactions on Industrial Electronics, Dec. 2004, vol. 51, No. 6, pp. 1280-1289.

Son et al., "Design and Control of a Modular Multilevel HVDC Converter With Redundant Power Modules for Noninterruptible Energy Transfer", IEEE Transactions on Power Delivery, Jul. 2012, vol. 27, No. 3, pp. 1611-1619.

Yang et al., "A Postfault Strategy to Control the Modular Multilevel Converter Under Submodule Failure", IEEE Transactions on Power Delivery, Dec. 2016, vol. 31, No. 6, pp. 2453-2463.

Yang et al., "Seamless Fault-Tolerant Operation of a Modular Multilevel Converter With Switch Open-Circuit Fault Diagnosis in a Distributed Control Architecture", IEEE Transactions on Power Electronics, Aug. 2018, vol. 33, No. 8, pp. 7058-7070.

* cited by examiner

100

Before-fault After-fault

Before-fault After-fault

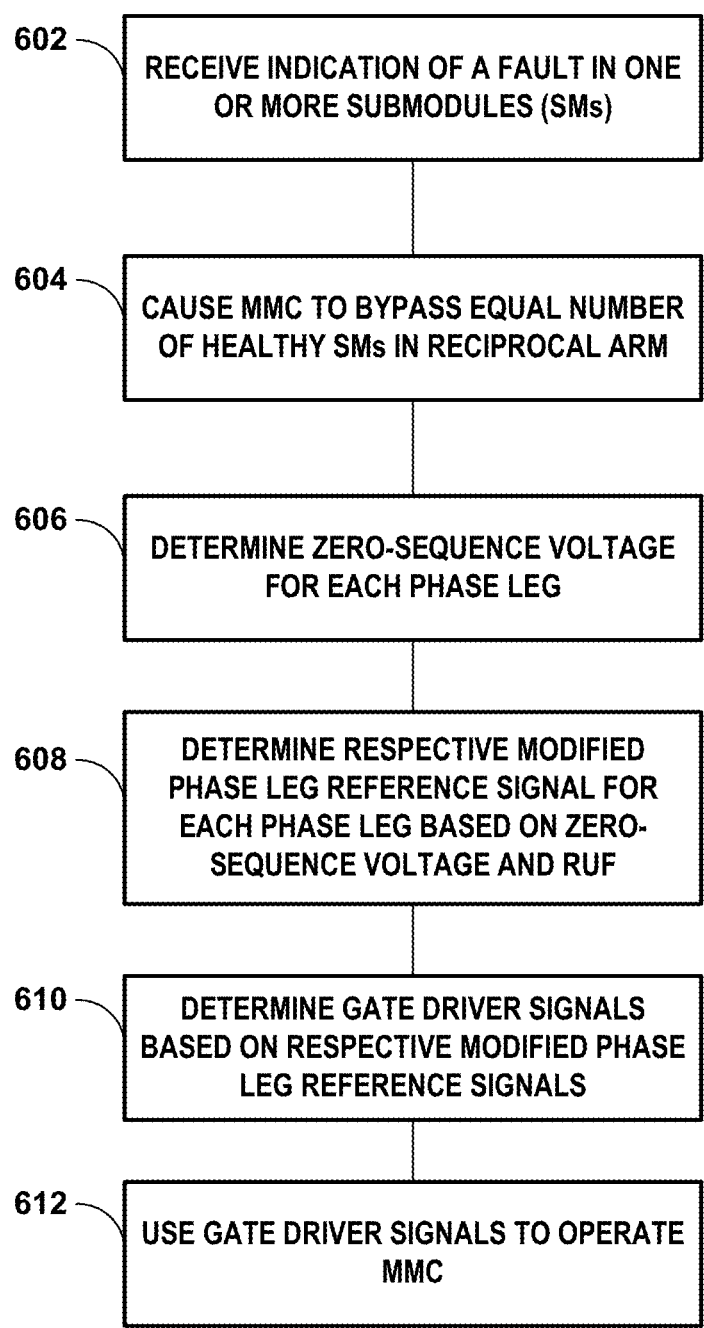

602 — RECEIVE INDICATION OF A FAULT IN ONE OR MORE SUBMODULES (SMs)

604 — CAUSE MMC TO BYPASS EQUAL NUMBER OF HEALTHY SMs IN RECIPROCAL ARM

606 — DETERMINE ZERO-SEQUENCE VOLTAGE FOR EACH PHASE LEG

608 — DETERMINE RESPECTIVE MODIFIED PHASE LEG REFERENCE SIGNAL FOR EACH PHASE LEG BASED ON ZERO-SEQUENCE VOLTAGE AND RUF

610 — DETERMINE GATE DRIVER SIGNALS BASED ON RESPECTIVE MODIFIED PHASE LEG REFERENCE SIGNALS

612 — USE GATE DRIVER SIGNALS TO OPERATE MMC

FIG. 6

SUBMODULE FAULT TOLERANCE IN MODULAR MULTILEVEL CONVERTERS

CROSS-REFERENCE TO RELATED APPLICATIONS

This application claims the benefit of U.S. Provisional Application No. 63/509,808, titled "FAULT TOLERANT METHODOLOGY FOR MODULAR POWER ELECTRONIC CONVERTERS" and filed Jun. 23, 2023, the entire content of which is incorporated herein by reference.

GOVERNMENT LICENSE RIGHTS

This invention was made with government support under Contract No. DE-AC36-08GO28308 awarded by the Department of Energy. The government has certain rights in the invention.

BACKGROUND

A modular multilevel converter (MMC) is an advanced voltage source converter applicable to a wide range of medium and high-voltage applications. As the name implies, the MMC has a modular design, using individual submodules (SMs) as building blocks. Since its first introduction, the MMC has gained considerable attention and development owing to its promising advantages such as excellent output performance, high modularity, simple scalability, and low voltage and current rating demand for the power switches. However, current systems and methods for handling SM failures in MMCs are fraught with problems.

Being one of the most common faults that happen in MMCs, an SM failure should not stop the nominal operation of the converter from transferring energy between the AC-supply and DC-bus and should minimize losses due to an imbalance of the phase voltages and the resulting circulating current flows across the legs. Certain related-art techniques attempt to remedy this through the inclusion of redundant SMs. This is commonly known as cold or spinning reserve. The fundamental idea is to bypass faulty SMs and replace them with the redundant healthy ones to maintain normal operations. But this is not cost-effective, particularly for MMCs with a low number of operational levels, since it constitutes a large percentage cost increase. Furthermore, this type of solution increases the size and volume of the converter due to the extra hardware. Another related-art technique that is completely hardware-based involves bypassing an equal number of healthy SMs from all arms and phases during post-fault conditions. However, this method reduces SM usage and power generation drastically and cannot meet the normal operational demands from the converter.

Another related-art fault-tolerance method utilizes a control strategy based on the SM capacitors' energy balancing in all phases after the fault. However, such a scheme is subject to severe circulating currents and a highly distorted DC-link current. Furthermore, it requires a number of design limitations to keep balanced energy flow within the phases. To date, some of the most acceptable solutions in the art regarding fault protection are based on the neutral shift (NS) principle.

The NS method modifies the angular displacements between the phases during the post-fault condition by shifting the virtual neutral point. However, this alters the internal dynamics of the MMC to compensate for the lost SM and associated voltage to maintain balanced line-to-line voltages and arm currents. Some related methods have improved the conventional NS principle by using a combination of DC voltage alteration, which implies a shift of the DC-bus virtual midpoint during post-fault and changed angular displacements and imbalanced voltages in the phases. These schemes typically require modifying the DC-bus voltage reference so that the modulation index can remain inside the under-modulation region. In addition, due to the loss of an SM, the MMC level of operation is reduced and, because of this change, the capacitor voltage of healthy SMs increases abruptly, which results in high transient currents. These negatively affect the converter operation for any utility and distribution network and the system might need to be shut down or operated at a much-reduced power level (below 50% of the nominal capacity). Also, these techniques often depend on a change in the DC-link reference to avoid any over-modulation, which hampers design specifications and energy requirements of a power system. Moreover, NS and combined DC shift principle requires a complicated mathematical formulation, and this intricate complication increases as the number of faulty SMs in the system increases. Additionally, an unequal power factor in different phases is another disadvantage of NS-based related-art methods, as it reduces the power efficiency of the system.

Another related-art method for SM failure involves injecting zero-sequence voltage (ZSV) into the phase voltage reference generation sub-system. This concept relies on the fact that for a multi-phase MMC, properties can be improved by augmenting the modulation reference signals with an appropriately calculated or scaled zero-sequence non-sinusoidal waveform that keeps the pulse width modulation (PWM) inside the optimum region and never allows over-modulation for a particular system. Adding this zero-sequence waveform to each reference phase voltage or inner EMF values does not change the output line-to-line voltage per carrier cycle average value. In addition, proper selection of this common-mode signal value reduces the switching losses and ameliorates the power quality. This scheme may work for continuous PWM (C-PWM) and discontinuous PWM (D-PWM) schemes, such as SVM, PD-PWM, CPS-PWM, etc., but ZSV injection alone cannot solve the circulating currents' impractically during capacitor voltage balance transient time (CVBTT) and post-fault condition.

Thus, there remains a need for improved systems and/or methods for minimizing the impact of faults occurring in the SMs of MMCs.

SUMMARY

In one example, a device includes at least one processor configured to receive an indication of a fault in one or more submodules (SMs) that are in a first arm of a first phase leg of a modular multilevel converter (MMC) and cause the MMC to bypass an equal number of healthy SMs in a second arm of the first phase leg. The at least one processor may be further configured to determine, a zero-sequence voltage for each phase leg and determine, for each phase leg, based at least in part on the zero-sequence voltage, a respective modified phase leg reference signal. The respective modified phase leg reference signal for the first phase leg may be determined further based in part on a reduced utilization factor (RUF) for the first phase leg. The at least one processor may be further configured to determine, based on the respective modified phase leg reference signal for each phase leg, gate driver signals for SMs in the MMC and cause the MMC to operate using the gate driver signals.

In another example, a method includes receiving an indication of a fault in one or more submodules (SMs) that are in a first arm of a first phase leg of a modular multilevel converter (MMC) and causing, by a device comprising at least one processor, the MMC to bypass an equal number of healthy SMs in a second arm of the first phase leg. The method may further include determining, by the device, a zero-sequence voltage and determining, by the device, for each phase leg, and based at least in part on the zero-sequence voltage, a respective modified phase leg reference signal. The respective modified phase leg reference signal for the first phase leg may be determined further based in part on a reduced utilization factor (RUF) for the first phase leg. The method may also include determining, by the device and based on the respective modified phase leg reference signal for each phase leg, gate driver signals for SMs in the MMC and operating the MMC using the gate driver signals.

In another example, a method performed by a modular multilevel converter (MMC) includes monitoring operation of the MMC for faults occurring in one or more of a plurality of submodules (SMs) positioned in the MMC and, when a faulty SM is detected in a first phase of the MMC, isolating the faulty SM. The method may further include, when the faulty SM is detected in the first phase of the MMC, bypassing a non-faulty SM and a first calculating of a reduced utilization factor (RUF) due to the faulty SM in the first phase. The method may further include a second calculating of a respective zero-sequence voltage (ZSV) for each phase and an injecting the ZSV into the phase voltages, resulting in the modifying of a reference signal for each phase ($U_{a\_ref}$, $U_{b\_ref}$, $U_{c\_ref}$). The MMC may include a leg having a first arm and a complementary arm, and each arm may include at least one of the plurality of SMs. The faulty SM may be positioned in the first arm and the bypassed non-faulty SM may be positioned in the complementary arm. The first calculating, the second calculating, and the injecting may be performed in a control module of the MMC and the control module operates the MMC using the modified reference signals, resulting in at least one of a suppression of a circulating current, a balanced leg voltage, a balanced arm current, a stable phase current, or a stable DC-bus current in the MMC.

The details of one or more examples are set forth in the accompanying drawings and the description below. Other features, objects, and advantages will be apparent from the description and drawings, and from the claims.

BRIEF DESCRIPTION OF THE DRAWINGS

FIG. 6 is a flow diagram illustrating example operations for SM fault tolerance in an MCC, in accordance with one or more aspects of the present disclosure.

REFERENCE NUMERALS

Figure 1A:
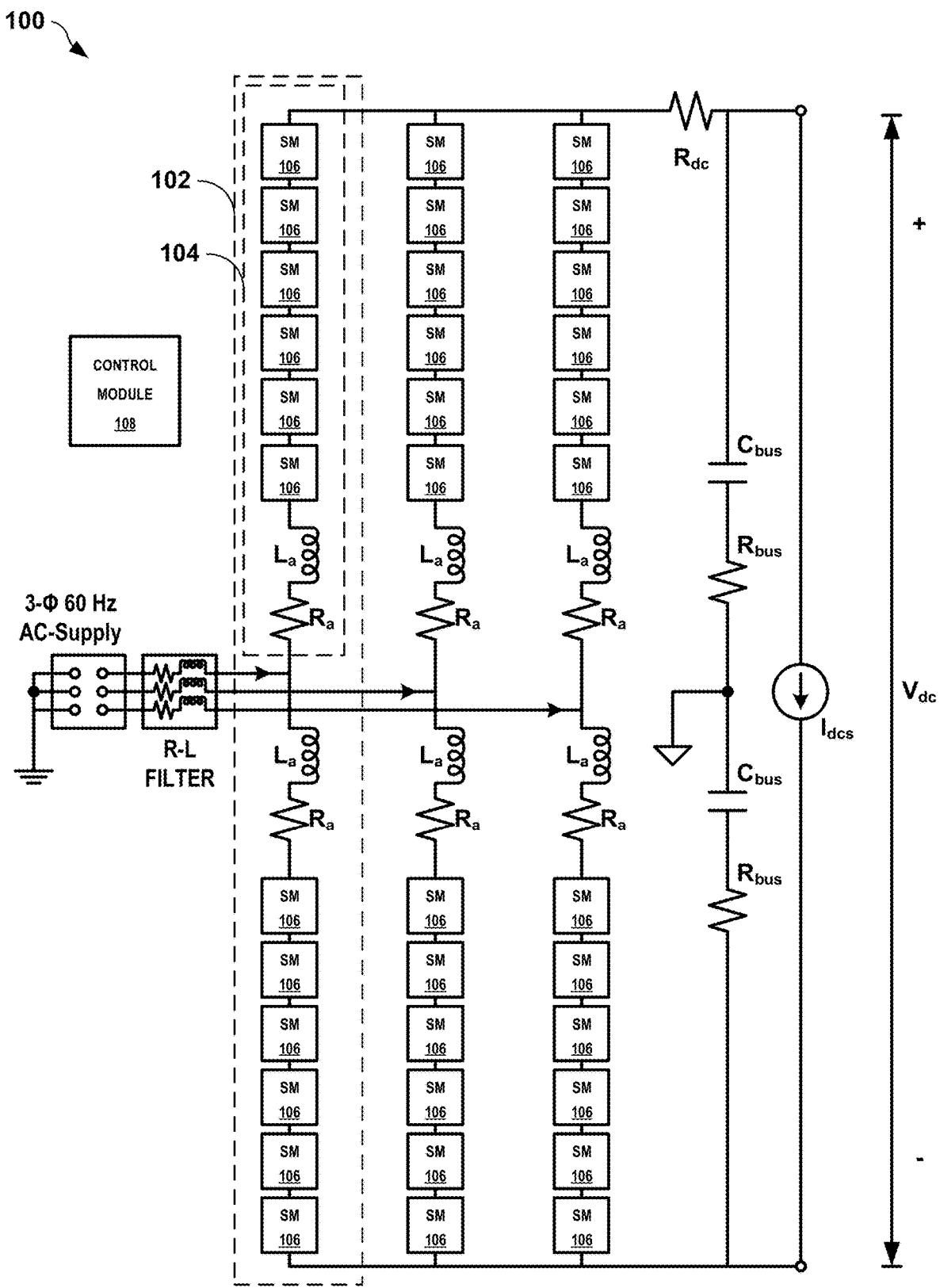
FIGS. 1A and 1B are conceptual diagrams illustrating an example modular multilevel converter (MMC) having submodule (SM) fault tolerance, in accordance with one or more aspects of the present disclosure and further details of an SM as used in the example MMC, respectively.

100 . . . modular multilevel converter (MMC)
102 . . . phase leg
104 . . . arm
106 . . . sub-module (SM)
108 . . . control module
150A, 150B . . . semiconductor switches
210 . . . DC-bus voltage controller
212 . . . reactive power controller
214 . . . phase current regulator
216 . . . dq0-to-abc transformation block
218 . . . phase leg references generation block
220 . . . circulating currents suppression block
222 . . . CPS-PWM block
224 . . . capacitor voltage balancing block

DETAILED DESCRIPTION

In contrast to these related-art methods, the techniques of the present disclosure provide a solution that does not require additional hardware or that significantly sacrifices power generation. While the techniques described herein also involve injection of ZSV into the phase voltage reference generation sub-system, additional aspects of the disclosed techniques avoid many of the problematic issues described above.

Among other things, the techniques of the present disclosure provide sub-module (SM) fault-tolerance for modular multilevel converters (MMCs). For instance, upon detection of a fault in a phase leg, an MMC configured in accordance with the techniques described herein may apply a reduced utilization factor (RUF) to the faulty phase leg, inject zero-sequence voltage (ZSV) into the phase voltages used to scale the reference signal value, and change the reference signals for modulation in all phases. As a result, the MMC may continue to ensure full utilization of the remaining, properly functioning, non-faulty SMs.

The techniques described herein compensate for SM failure by altering the internal dynamics of the MMC, such as the arm voltages and the modulation reference of the faulty phase. This is achieved while maintaining the same pre-fault voltages on both the alternating AC and DC sides of the MMC. In addition, aspects of the techniques of the present disclosure do not impose any overdesign requirement on SM capacitors, modulation, DC-bus, and/or other external design variables. This fault-tolerant technology provides improved reliability for MMCs. These techniques may be particularly helpful for MMCs for community-based medium-voltage DC (MVDC) energy access and distribution networks.

FIG. 1A is a conceptual diagram illustrating an example MMC (MMC 100) having SM fault tolerance, in accordance with one or more aspects of the present disclosure. In the example of FIG. 1A, MMC 100 is configured to receive input from a three-phase, 60 Hz, alternating current (AC) supply which may first be passed through an R-L filter. MMC 100 is configured to convert the input into a single phase, direct current (DC) output on a DC bus, denoted in FIG. 1A as Vdc. MMC 100 is only one example of an MMC configured to implement the fault tolerance techniques disclosed herein, and various other MMCs may utilize the techniques of the present disclosure in other examples.

As shown in the example of FIG. 1A, MMC 100 includes three legs, with each leg being configured to process a single phase of the input. For illustration purposes, dashed box 102 denotes one phase leg, which is configured to process a first phase, e.g., Phase A, of the input, with MMC 100 having a corresponding second leg and third leg to process a second phase, e.g., Phase B, and third phase, e.g., Phase C, respectively. Each leg of MMC 100 includes two symmetrical arms-a lower arm and an upper arm. For illustration purposes, dashed box 104 denotes the upper arm of phase leg 102. Each leg of each arm of MMC 100 is made up of an arm resistor (Ra), an arm inductor (La), and one or more SMs. For example, each arm of MMC 100, including arm 104, includes six instances of SM 106. While each arm shown in the example of FIG. 1A includes six instances of SM 106, the techniques of the present disclosure are applicable in MMCs including almost any number of SMs in each arm. For instance, the techniques described herein may be used with MMCs having two SMs in each arm, ten SMs in each arm, or any other number of multiple SMs in each arm.

In the example of FIG. 1A, MMC 100 also includes control module 108. In the example of FIG. 1A, control module 108 may represent a processor as well as software executable by the processor. In other examples, control module 108 may represent hardware, such as an application specific integrated circuit (ASIC), software or firmware, such as binary code executable by a processor or field programmable gate array (FPGA), or some combination thereof.

For brevity, the operational connections between control module 108 and various other components of MMC 100 are not included in FIG. 1A. Control module 108 is configured to receive information about MMC 100 and control various aspects of its operation, including the operation of each instance of SM 106. In the example of FIG. 1A, control module 108 is configured to implement the techniques described herein regarding SM fault tolerance. Further details regarding control module 108 and its operation are provided below.

Figure 1B:
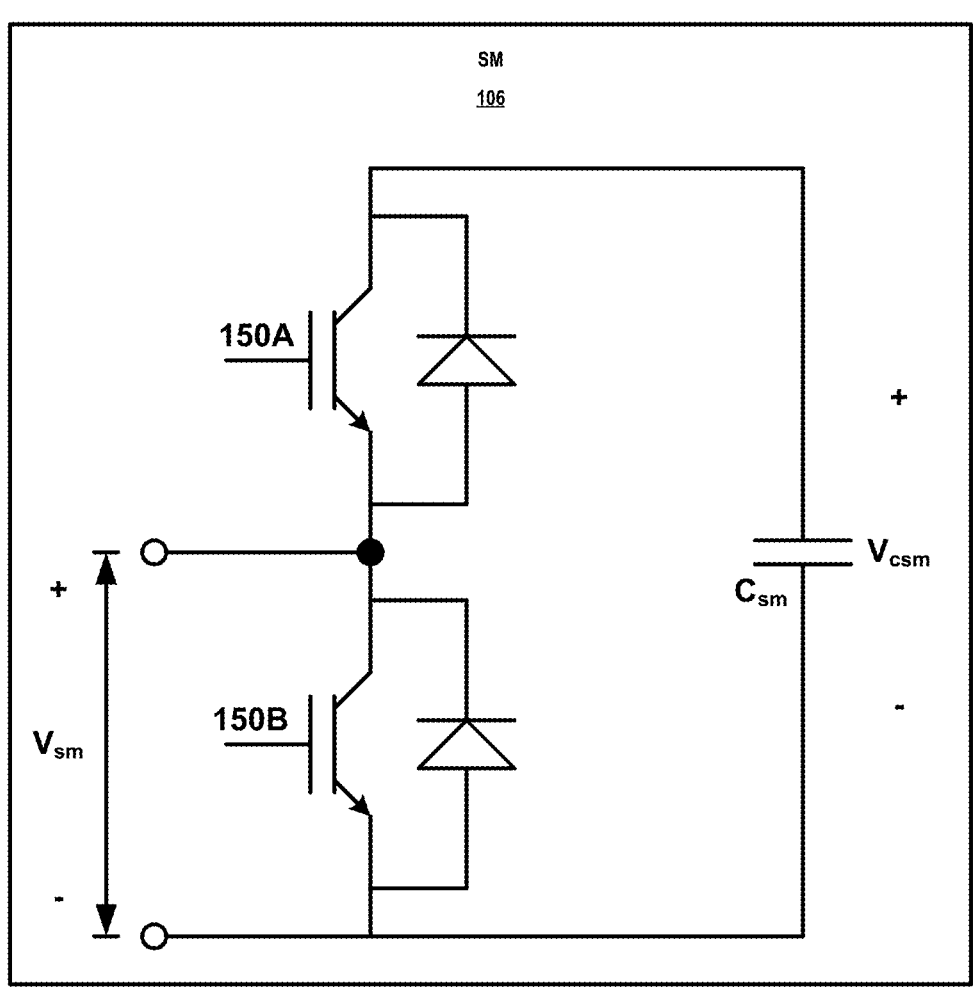

FIG. 1B is a conceptual diagram illustrating further details of SM 106 as used in MMC 100 of FIG. 1A. As shown in the example of FIG. 1B, SM 106 may be a half-bridge cell, including two semiconductor switches 150A and 150B (such as insulated-gate bipolar transistors or IGBTs) with anti-parallel diodes and a capacitor. The voltage of SM 106 is shown in the example of FIG. 1B as $V_{sm}$. While shown in the example of FIG. 1B as a half-bridge cell, the techniques described herein will work with other SM types. That is, the techniques of the present disclosure have a broad scope of all the SM configurations, including, for example full bridge, hybrid, neutral point clamped, and/or diode clamp configurations.

When no SM fault is detected, control module 108 may continue normal operation of MMC 100, including monitoring for SM faults. In accordance with the techniques of the present disclosure, however, when a fault occurs in an SM, control module 108 is configured to modify operation of MMC 100. That is, when a fault is detected, a uniquely fault tolerant algorithm that employs either RUF or RUF and ZSV is employed. In this way, control module 108 may ensure continued operation by using, e.g., the combination of RUF and ZSV to provide a robust fault-tolerant system. In the present disclosure, the term ZSV is used but, in various examples, this term more generally represents the voltage or potential difference between the AC neutral and DC-link mid-point. Another common representation for such quantity, which may be used in some examples of implementing the techniques described herein, is star-point potential or SPP.

In accordance with the techniques of the present disclosure, upon detecting a fault in one or more SMs 106, control module 108 may localize the SM fault and cause MMC 100 to bypass the faulty instance(s) of SM 106 by modifying the capacitor voltage balancing scheme. This may be achieved through the application of a reduced carrier phase shifted pulse-width modulation (CPS-PWM) signal when generating gate signals. As an example, referring to FIGS. 1A and 1B, if one SM were to fail in arm 104, it may be detected by control module 108 through observation of the corresponding SM capacitor voltage dropping significantly due to being shorted-out (e.g., the voltage drop across La in FIG. 1A). The sorting-based capacitor voltage balancing algorithm of control module 108 may cause MMC 100 to bypass this faulty SM, and no gate signal would be fed to the faulty SM. For the defective phase, control module 108 may reduce the original 6-level modulation to 5 levels through alteration of the carrier signal and phase displacement.

Control module 108 may cause MMC 100 to bypass (e.g., using a breaker switch and/or restricting gate driver signals) an equal number of healthy SMs in the complementary arm to ensure uniformity of level of operation and stable modulation throughout. In the case example, for a single SM fault in arm 104, control module 108 may cause MMC 100 to bypass a healthy SM from the lower arm of phase leg 102. In accordance with this physical change, control module 108 may apply the 5-level CPS-PWM in the lower arm of phase leg 102 as well.

Control module 108 may determine a RUF based on gain loss due to SM failure in the faulty leg. Specifically, control module 108 may calculate RUF according to Equation (1), $$RUF = \frac{N - N_{fm}}{N} \tag{1}$$

where N is the original SM count per arm and $N_{fm}$ is the larger of the number of faulty SMs in each arm of the leg, determined as max $\{N_{fu}, N_{fl}\}$, in which $N_{fu}$ and $N_{fl}$ depict the number of faulty SMs in the upper arm and lower arm of the leg, respectively. Thus, in the example illustrated in FIG. 1A, N=6, $N_{fm}$=1, and RUF=0.833 for a single SM fault in arm 104. Control module 108 would thus determine an RUF of 0.833, which implies a 16.67% loss in SM operation along the line voltage trajectory.

Control module 108 may include the determined RUF as a fractional gain in the generation of a phase leg reference signal for the faulty leg. As a result, the scale of the modulation setpoint for the faulty leg would remain between 0 to 1 without any overmodulation. To illustrate, using the case example, control module 108 will utilize the designed derated nominal reference signal for Phase A (i.e., phase leg 102). Accordingly, the upper and lower arm voltages of phase leg 102 are reduced while the phase leg voltage of phase leg 102 remains the same because of voltage balancing and control. By applying RUF in this way, the techniques of the present disclosure may enable full utilization of the remaining, healthy SMs in a faulty leg. For clarity, control module 108 may not include the determined RUF as a fractional gain when generating phase leg reference signals for other, "healthy", i.e., "fault-free", phases (Phase B and Phase C). This is because these phase legs do not have any failed or bypassed SMs and can fully utilize all the SMs in operation.

Control module 108 may inject properly scaled ZSVs into the generation of phase leg references to modify the upper and lower arm reference signals and alter the internal dynamic variables (phase voltages, modulation index values, reference signal waveforms) of MMC 100. As one example, control module 108 may determine a scaled ZSV using the following equation.

$$V_{ZS} = 0.5 V_{dc}(1 - 2\sigma) + (1 - \sigma)V_{min} + \sigma V_{max} \tag{2}$$

where $0 \le \sigma \le 1$ is the generalized distribution coefficient, and $V_{max}$ and $V_{min}$ are the instantaneous maximum and minimum values of the phase voltages, respectively. The following equation may be used to approximate $\sigma$ $$\sigma = \frac{2\left(\frac{N - N_{fm}}{N} - 0.5\right) + (1 - m\sqrt{3})}{2 - m\sqrt{3}} \tag{3}$$

where m is the original modulation index. In some examples, the parameter $\sigma$ can be pre-determined. For instance, $\sigma$ may be selected as 0.5, which may provide a convenient way to ensure proper energy balance and distribution in each phase and among the legs and operating SMs for CPS-PWM.

The SM fault-tolerance techniques described herein are able to tolerate up to $$N_{fm} \le \frac{1}{2}N.$$

As one example, in an MMC having six SMs per arm, the techniques of the present disclosure could compensate for a maximum failure of three SMs per arm while continuing to keep stable and balanced energy dissipation and avoiding usage of over-modulation slack in PWM.

It is noted that a tolerance solution based on RUF alone—that is, only RUF inclusion in the faulty leg reference generation—may perform acceptably, if the DC-bus reference were increased. In such a gain-based scheme, the internal dynamics could be altered. However, without changing the DC-bus reference, the system would go into the over-modulation region, which cannot be permitted in a utility converter. As a concrete example, to utilize only RUF inclusion in the faulty leg reference generation to address a single SM fault, the DC bus reference would need to be overdesigned by about 17-20% to avoid over-modulation, which incurs external variable change and overall system design alteration. Most related art SM fault tolerance methods typically include approximately 7-20% overdesign. In contrast, the combined techniques described herein, utilizing RUF and ZSV, do not require any overdesign.

Likewise, other methods, such as applying NS, combined DC with NS, only ZSV injection or only RUF without augmentation of the DC-bus reference, would also require overdesign of the SM capacitor due to the increased voltage stress that would be imposed on the remaining SMs in the faulty leg. Furthermore, high circulating currents would result from imbalanced capacitor voltages, worsening the operational characteristics of the converter. Eventually, the system may even break down after long periods of practical runtime. In contrast, the techniques of the present disclosure do not need any SM capacitor overdesign for any voltage stress, since the voltage remains the same for healthy SM capacitors and no CVBTT effect is observed.

For at least these reasons, the techniques of the present disclosure have numerous technical advantages over existing techniques for controlling SM faults in CCMs. First, circulating currents are suppressed with no modification in the circulating currents control loop. Additionally, no high transients and instability are observed at the moment of the fault or post-fault with tolerance during CVBTT. Another advantage is that no change or augmentation of the DC-bus voltage or power references is required. This is helpful, as such changes can incur external parameter and variable alteration to ensure MMC optimal operation. The techniques described herein also require no increase in the original modulation index and, hence, over-modulation is never allowed in the cycles of operation. Furthermore, as stated above, no overdesign at the DC-bus or SM capacitors is required.

As yet another advantage, the internal dynamics of the MMC change and accordingly, the phase, arm, and DC-bus currents are balanced and stable, and phase leg voltages are balanced. As an additional advantage, the techniques described herein are computationally very efficient, since there are no complicated online (i.e., real-time) mathematical computations or offline look-up table generation required. The control techniques of the present disclosure are easy to implement in real-time and provide scalability for different fault scenarios in practical use cases.

The techniques of the present disclosure may also provide many competitive industrial advantages, as well. For example, a software-based solution does not require any high-performance computational tools or devices to implement in a real-time test environment. This means resource utilization and overheads can be very cost-effective and computation-friendly. Additionally, the techniques provided herein require no additional hardware or measurement equipment for deployment and verification. The techniques of the present disclosure can be considered as a universal solution technique for SM faults in single or multi-unit MMCs and other multi-level cascaded converters with half- and full-bridge switching configurations that support utility systems and microgrid building block projects.

While described herein in the context of three-phase MMCs, the techniques of the present disclosure may be utilized in MMCs handling any number of phases. For example, the techniques provided herein may be employed in single-phase MMCs, as well as in MMCs handling 6 or any other number of phases.

Figure 2:
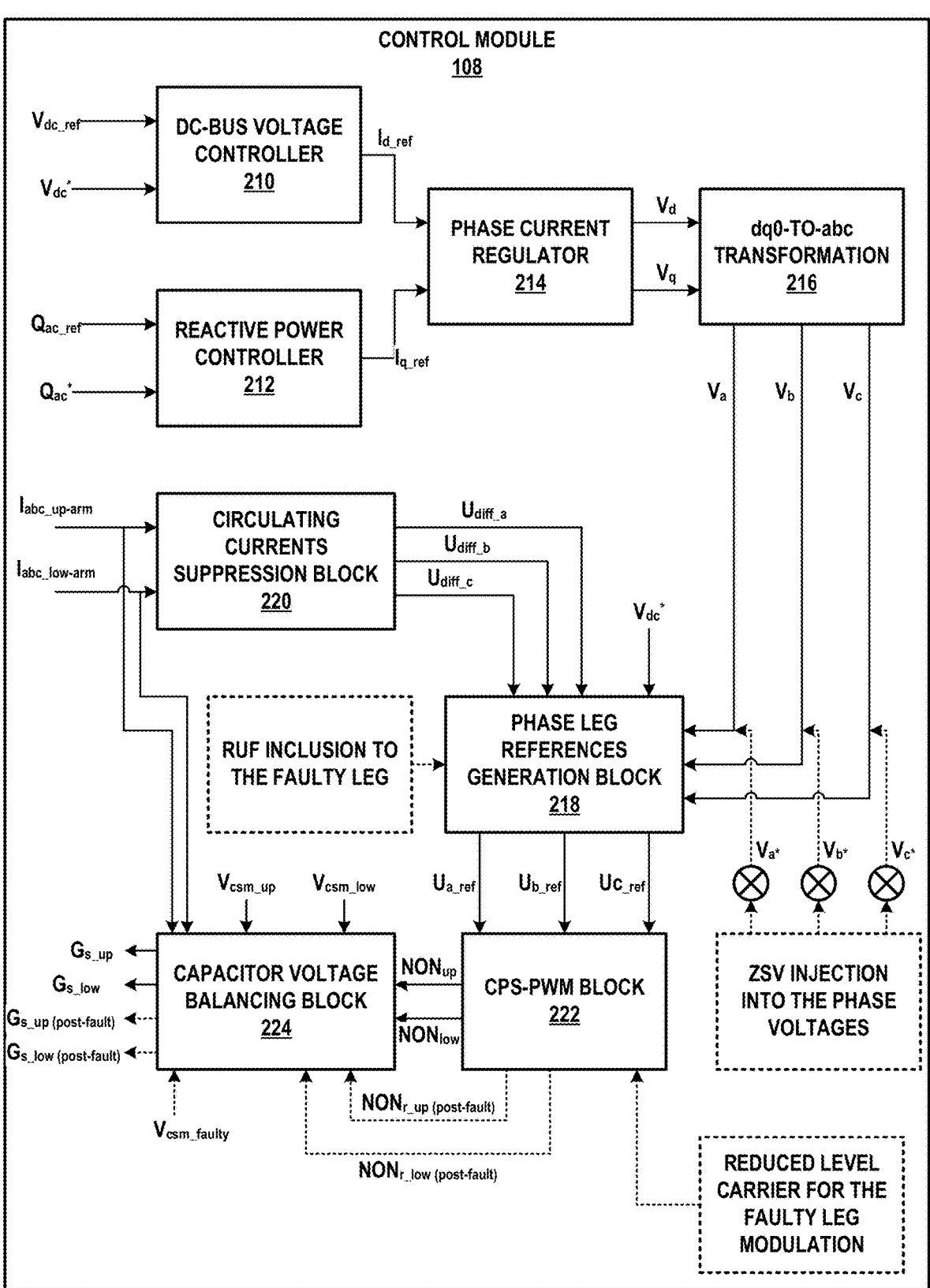
FIG. 2 is a block diagram illustrating further details of an example MMC control module having fault tolerance, in accordance with one or more aspects of the present disclosure.

FIG. 2 is a block diagram illustrating further details of an example MMC control module (e.g., control module 108) having fault tolerance, in accordance with one or more aspects of the present disclosure. Control module 108 includes DC-bus voltage controller 210, reactive power controller 212, phase current regulator 214, dq0-to-abc transformation block 216, phase leg references generation block 218, circulating currents suppression block 220, CPS-PWM block 222, and capacitor voltage balancing block 224. Each of components 210, 212, 214, 216, 218, 220, and/or 224 may represent software or hardware configured to perform the operations described herein. For instance, components 210, 212, 214, 216, 218, 220, and/or 224 may represent software configured to be executed by a processor (not shown). The example of FIG. 2 represents only one example of a control module 108 configured to perform the techniques described herein, and other control modules, including those having more, fewer, or different components or logic blocks may also be configured in accordance with the techniques described herein.

It should be noted that most utility loads and converter structures follow a wye or star configuration. Therefore, the techniques of the present disclosure are primarily described within the context of a double-star MMC architecture where each phase leg is segmented into the top and bottom arms, with an example of such an architecture illustrated in FIG. 1A. The MMC architecture operates in grid-connected mode. The DC-bus is formed by a capacitive branch and a controlled current source to regulate the MMC's required voltage and power flow. The MMC has multi-loop controllers composed of DC-bus voltage controller 210 and AC reactive power controller 212 as external control loops that generate current reference signals for internal phase current regulator 214. Circulating currents suppression block 220 is designed to reduce $2^{nd}$ harmonic components superimposed on the existing arm currents of the converter. The control loops depicted in the example of FIG. 2 follow the principles of proportional-integral (PI) and synchronous reference frame-based control schemes developed through transfer function derivation, phase margin requirement and cross-over frequency (or controller bandwidth) selection for the compensation. For brevity, a detailed description of the standard control operations shown in the example of FIG. 2 is not provided herein.

In the example of FIG. 2, DC-bus voltage controller 210 is configured to receive a DC-link voltage reference ($V_{dc\_ref}$) and an actual DC-link voltage ($V_{dc}^*$) of the MMC and generate a d-q current component reference, $I_{d\_ref}$ based on $V_{dc\_ref}$ and $V_{dc}^*$.

In the example of FIG. 2, reactive power controller 212 is configured to receive a reactive power reference ($Q_{ac\_ref}$) and an instantaneous reactive power ($Q_{ac}^*$) of the MMC and use them to generate a d-q current component reference, $I_{q\_ref}$ based on $Q_{ac\_ref}$ and $Q_{ac}^*$.

In the example of FIG. 2, phase current regulator 214 is configured to receive the d-q current component references ($I_{d\_ref}$ and $I_{q\_ref}$) and generate d-q voltage components, $V_d$ and $V_q$ based on $I_{d\_ref}$ and $I_{q\_ref}$.

In the example of FIG. 2, dq0-to-abc transformation block 216 is configured to transform the d-q voltage components ($V_d$ and $V_q$) into a phase voltage for each of three phases ($V_a$, $V_b$, and $V_c$).

In the example of FIG. 2, circulating currents suppression block 218 is configured to receive upper-arm and lower-arm currents for each leg of the MMC ($I_{abc\_up-arm}$ and $I_{abc\_up-arm}$) and generate a difference voltage for each of the three phases ($U_{diff\_a}$, $U_{diff\_b}$, and $U_{diff\_c}$) based on $I_{abc\_up-arm}$ and $I_{abc\_up-arm}$ for each leg.

In the example of FIG. 2, phase leg references generation block 220 is configured to generate a PWM reference for each of the three phases ($U_{a\_ref}$, $U_{b\_ref}$ and $U_{c\_ref}$). To do so, phase leg references generation block 220 may receive and utilize the three phase voltages ($V_a$, $V_b$, and $V_c$), the three difference voltages ($U_{diff\_a}$, $U_{diff\_b}$, and $U_{diff\_c}$), and the DC-link voltage ($V_{dc}^*$) during normal operation. Additionally, in accordance with the techniques described herein, when a faulty SM has been detected, rather than utilizing the three phase voltages themselves, phase leg references generation block 220 is configured to generate $U_{a\_ref}$, $U_{b\_ref}$ and $U_{c\_ref}$ using modified versions of the phase voltages ($V_a^*$, $V_b^*$, and $V_c^*$), which include the injection of properly scaled ZSV. Furthermore, when a faulty SM has been detected, phase leg references generation block 220 is configured to receive and use the determined RUF in generating the phase leg reference for the faulty leg.

In the example of FIG. 2, CPS-PWM block 222 is configured to receive the three PWM references ($U_{a\_ref}$, $U_{b\_ref}$ and $U_{c\_ref}$) and use them to generate the number of ON SMs in all the upper and lower arms ($NON_{up}$ and $NON_{low}$). Additionally, in accordance with the techniques of the present disclosure, when a faulty SM has been detected, CPS-PWM block 222 is configured to receive and use a reduced level carrier for the faulty leg and generate the number of ON SMs in all the upper and lower arms during post-fault operation. ($NON_{r\_up(post\_fault)}$ and $NON_{r\_low(post\_fault)}$).

In the example of FIG. 2, capacitor voltage balancing block 224 is configured to receive the upper-arm and lower-arm currents for each leg of the MMC ($I_{abc\_up-arm}$ and $I_{abc\_up-arm}$), SM capacitor voltages of the upper and lower arms for each leg of the MMC ($V_{csm\_up}$ and $V_{csm\_low}$), and the number of ON SMs in all the upper and lower arms ($NON_{up}$ and $NON_{low}$). Capacitor voltage balancing block 224 is configured to utilize these values to generate gate driver signals for all SMs during normal operation ($G_{s\_up}$ and $G_{s\_low}$). Additionally, in accordance with the techniques described herein, when a faulty SM has been detected, capacitor voltage balancing block 224 is configured to receive the number of ON SMs in all the upper and lower arms during post-fault operation ($NON_{r\_up(post\_fault)}$ and $NON_{r\_low(post\_fault)}$) and a voltage (or voltages) of the failed SM(s) ($V_{csm\_faulty}$) and use these values to generate gate driver signals for the non-faulty SMs during post-fault operation ($G_{s\_up(post\_fault)}$ and $G_{s\_low(post\_fault)}$).

As shown in the example of FIG. 2, the techniques of the present disclosure provide SM fault tolerance through use of RUF and ZSV. Notably, the techniques described herein provide suppression of circulating currents in an MMC without substantive change in the controller block. The techniques provided herein also provide balanced leg voltages, balanced arm currents, and stable phase currents and DC-bus currents. Furthermore, there are no overdesign requirements for the SM capacitors or modulation index, and no overdesign or alteration requirements in the DC-bus reference or any other external design variables. The techniques provided herein represent a computationally simple, cost-effective, easy-to-implement, and scalable solution.

Figure 3:
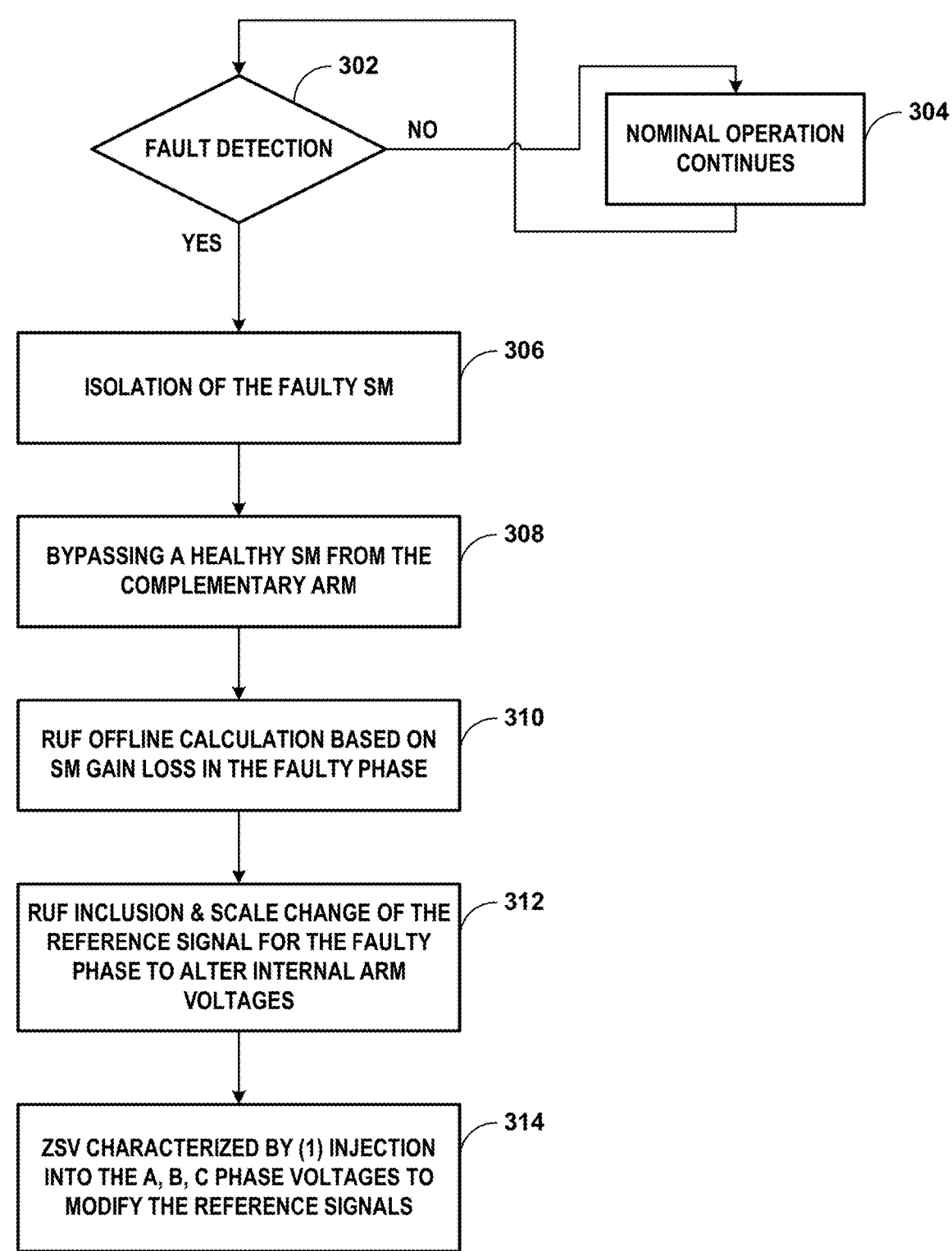
FIG. 3 is a flow diagram illustrating example operations for SM fault tolerance in an MMC, in accordance with one or more aspects of the present disclosure.

FIG. 3 is a flow diagram illustrating example operations for SM fault tolerance in an MMC, in accordance with one or more aspects of the present disclosure. The example operations of FIG. 3 are described below within the context of FIGS. 1A and 1B.

In the example of FIG. 3, a control module of a MMC may monitor SMs of the MMC for faults (302). For example, control module 108 of MMC 100 may detect the SM short-circuit fault by monitoring the SM capacitor voltage consistently during transient operations. There is a pre-specified threshold of SM capacitor voltage such as 10% of the nominal value to detect if there is any catastrophic short-circuit failure in the inserted SM or not.

While no fault is detected ("NO" branch of operation 302), the control module may continue nominal operation of the MMC (304). The nominal operation of MMC 100 by control module 108 is beyond the scope of this disclosure and thus not detailed herein.

Responsive to determining that a fault in one or more SMs has occurred ("YES" branch of operation 302), the control module may, in the example of FIG. 3, isolate the one or more faulty SMs (306). For example, if control module 108 determines that a fault has occurred in the upper-most instance of SM 106 in arm 104, may modify the balancing scheme to exclude utilization of the faulty SM.

In the example of FIG. 3, the control module may bypass a corresponding number of healthy SMs from the complimentary arm (308). For example, if control module 108 may bypass one instance of SM 106 in the lower arm of phase leg 102.

The control module may, in the example of FIG. 3, determine an RUF based on the SM gain loss in the faulty phase (310). For example, control module 108 may calculate $$RUF = \frac{N - N_{fm}}{N}$$

as detailed herein.

In the example of FIG. 3, the control module may include the determined RUF in the generation of a phase leg reference signal for the faulty leg, thereby changing the scale of the modulation setpoint for the faulty leg (312). For example, control module 108 would include the RUF when generating the reference signal for phase leg 102, changing the modulation setpoint for phase leg 102.

The control module may, in the example of FIG. 3, inject, into the three phase voltages, the ZSV characterized by Equations (2) and (3), above, in order to modify the reference signals (314). For example, control module 108 may inject the ZSV values into the phase voltages for use in generating each phase leg reference value.

In some examples, an RUF value and ZSV value may only be determined responsive to detection of a fault in one or more SMs. That is, RUF and ZSV are based on the number of healthy, operating SMs being used, and thus do not need to be redetermined unless a subsequent SM fault occurs. In some examples, the RUF and/or ZSV may be determined periodically or at some other interval.

Figure 4:
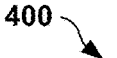
FIG. 4 is a conceptual diagram illustrating an example MMC having SM fault tolerance, in accordance with one or more aspects of the present disclosure.

FIG. 4 is a conceptual diagram illustrating an example MMC (MMC 400) having SM fault tolerance, in accordance with one or more aspects of the present disclosure. MMC 400, as shown in the example of FIG. 4, may be substantially similar to MMC 100 depicted in the example of FIGS. 1A and 1B. In the example of FIG. 4, the upper most instance of SM 406 in the upper arm of the leg for Phase A, shown with a dashed and dotted line, will encounter a fault. Additionally, MMC 400 may have a ZSV virtual port connection, as shown in FIG. 4.

In the example of FIG. 4, $I_{jp}$ and $I_{jn}$, with j=a, b, c indicate the upper and lower arm currents, respectively and $I_{acc}$, $I_{bcc}$ and $I_{ccc}$ indicate the circulating currents across the phase legs, respectively. G indicates the neutral point of the AC-supply and N indicates the virtual midpoint of the DC-bus. $V_{Zs}$ represents the ZSV or SPP and $I_{dcs}$ represents the DC-link current across a controlled current source. Table 1 shows the specifications of the major MMC parameters for test case analysis.

TABLE 1

| Parameter | Specification |
|---|---|
| Phase-Phase RMS AC Voltage | 4 kV |
| DC-Bus Voltage Ref. | 10 kV |
| Modulation Index, m | 0.8 |
| SM Capacitance $C_{sm}$ | 22.5 mF |
| DC-Bus Capacitance $C_{bus}$ | 12.5 mF |
| Active Power Support | 5 MW |

TABLE 1-continued

| Parameter | Specification |
|---|---|
| Simulation Time-Step | 25 μs |
| Effective Switching Frequency | 2 kHz |
| PWM Carrier Frequency | 333.33 Hz |
| Arm Inductance $L_a$ and Resistance $R_a$ | 1.6 mH and 0.1 Ω |

The MMC shown in the example of FIG. 4 was used to perform a case study utilizing the techniques of the present disclosure. In the study, the switching MMC model was deployed on the Opal-RT simulator OP5607 with a Virtex707 processor for a small time-step of 25 us with zero overrun in real-time execution. The simulations were performed using the RT-Lab package, where the ARTEMiS solver guide was applied, following a well-established electromagnetic transient program (EMTP) algorithm for real-time high-speed computations, named as state-space nodal (SSN). The RT-Lab simulation model consisted of a master sub-system, which contained the plant and control circuits and components, and a console sub-system, which contained the Opal scope for data logging and measurements in real-time and which was connected to the master through a communication linking block. The extreme high performance (XHP) mode was enabled, and two processor cores were assigned for parallel and fast deployment and computation. The converter was operated in inverter mode.

Figure 5A:
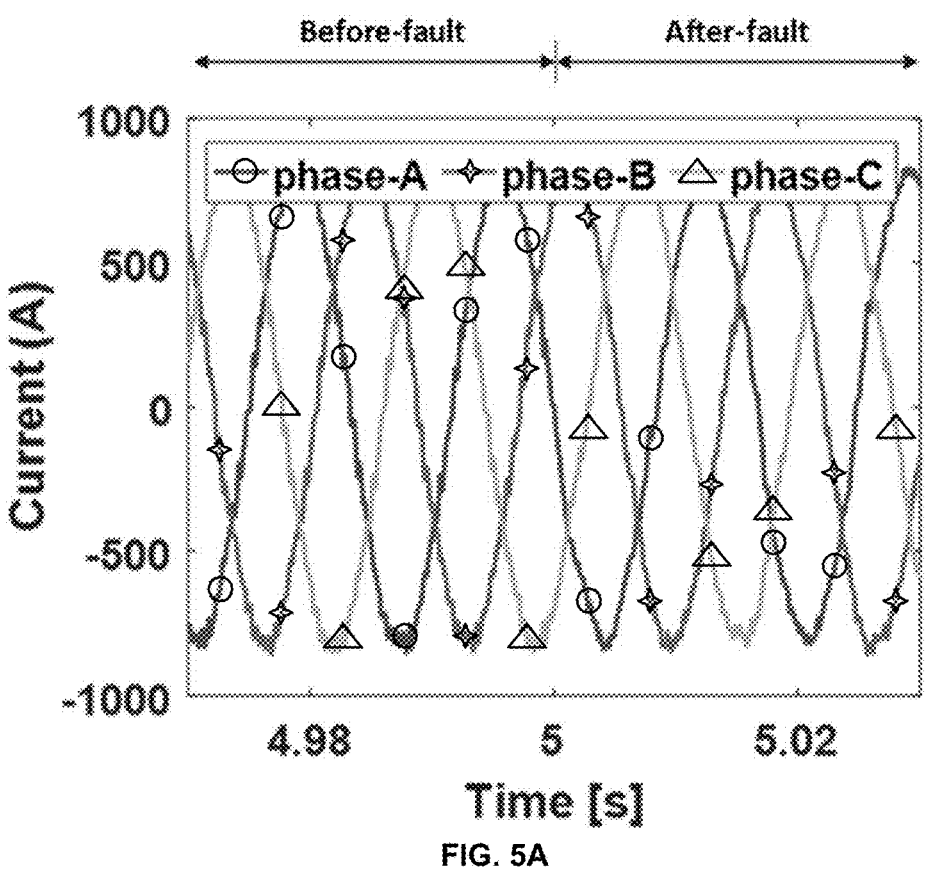
FIGS. 5A-5H are graphical plots illustrating the real-time simulation results of the MMC shown in the example of FIG. 4 before and after SM fault.
Figure 5B:
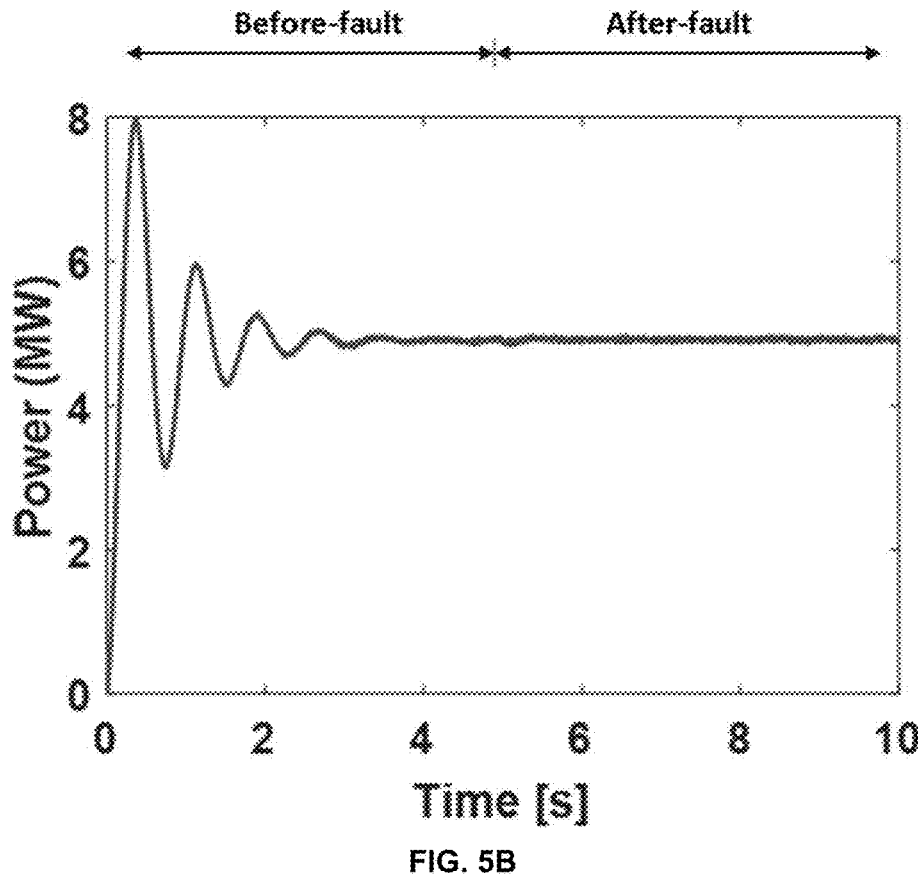
Figure 5C:
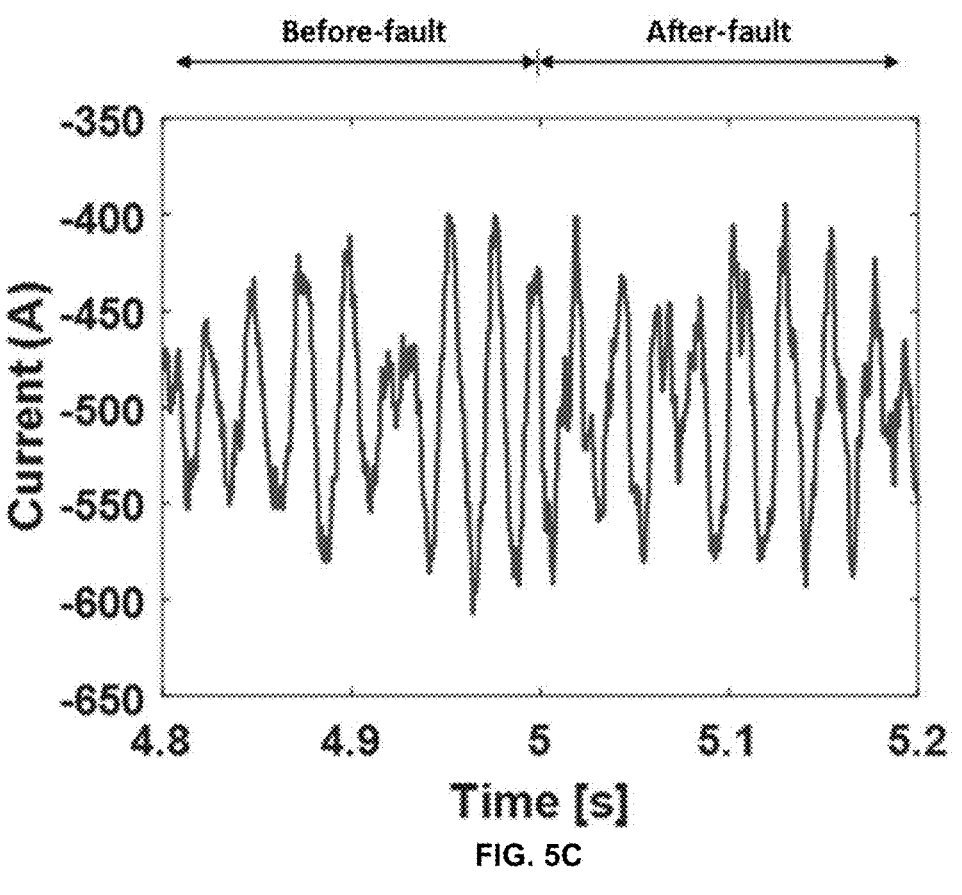

FIGS. 5A-5H are graphical plots illustrating the real-time simulation results of MMC 400 before and after SM fault. In FIGS. 5A-5H, the fault occurs at t=5 s. Specifically, FIG. 5A illustrates the phase currents at the AC-side of MMC 400 and FIG. 5B illustrates the active power support of approximately 5 MW. FIG. 5C illustrates the DC-bus current swinging around 500 A. Note that in FIG. 5C, the negative sign is due to MMC 400 operating in inverter mode.

Figure 5D:
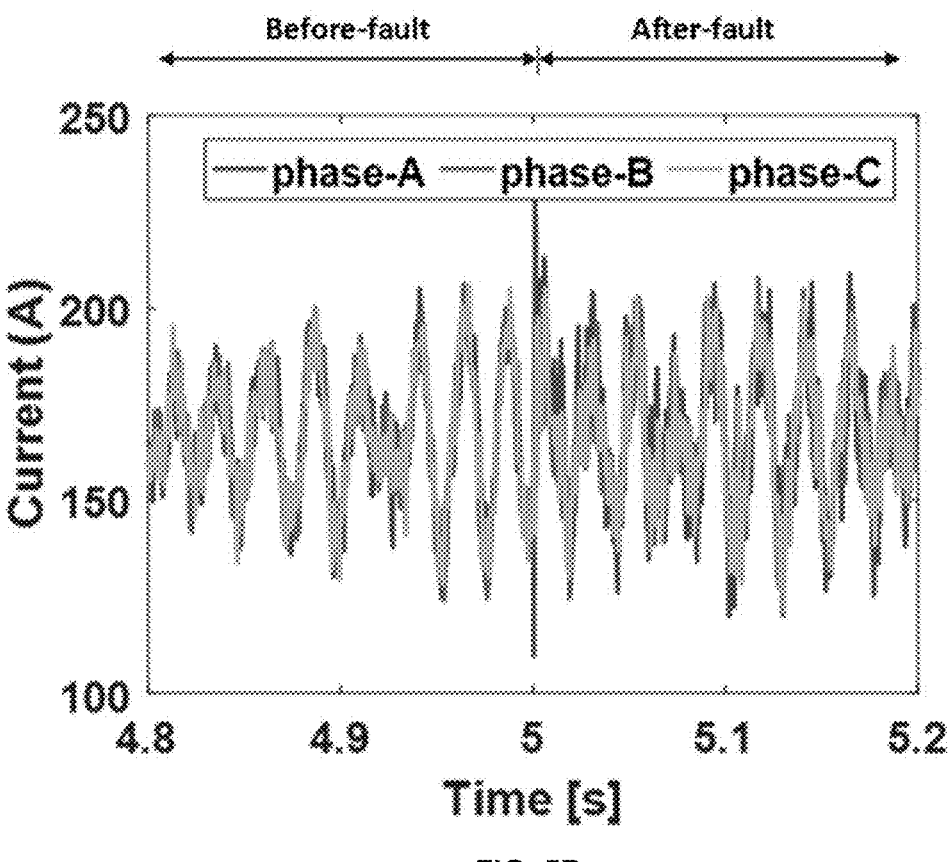

FIG. 5D illustrates the circulating currents of phase-A, B, & C:

$$|Icc| = \frac{1}{3}I_{dc}.$$

As can be seen in FIG. 5D, there is a momentary transient at the fault instant t=5 s and it is suppressed immediately during post-fault operation.

Figure 5E:
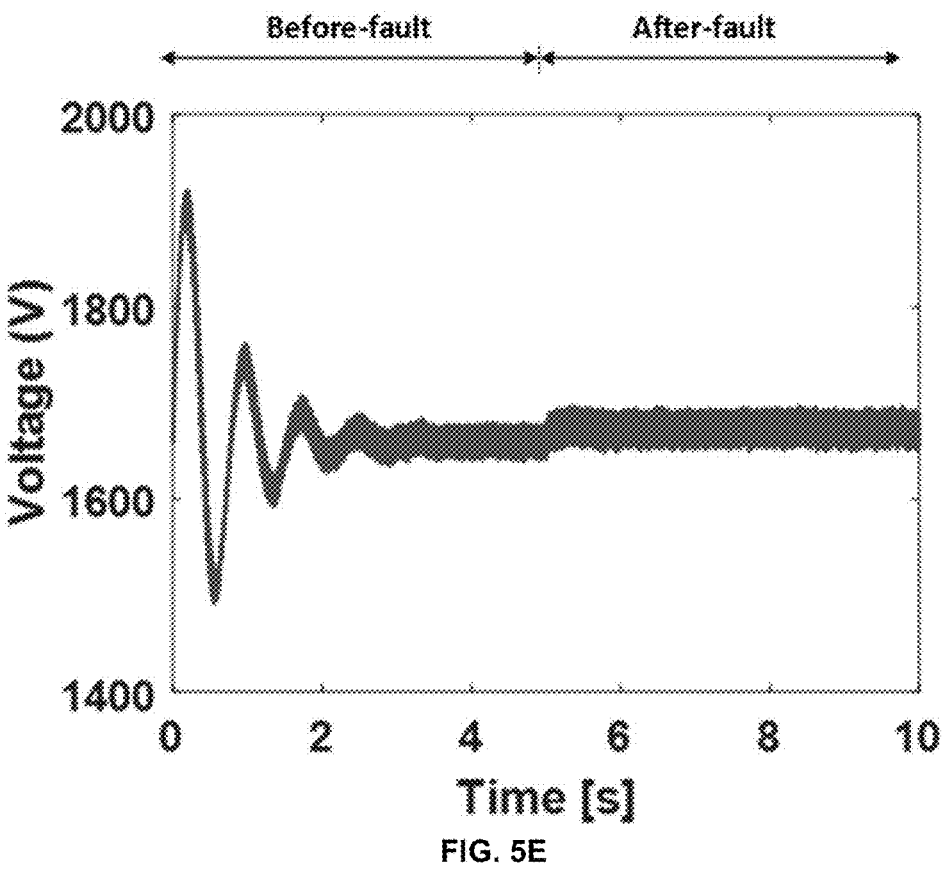
Figure 5F:
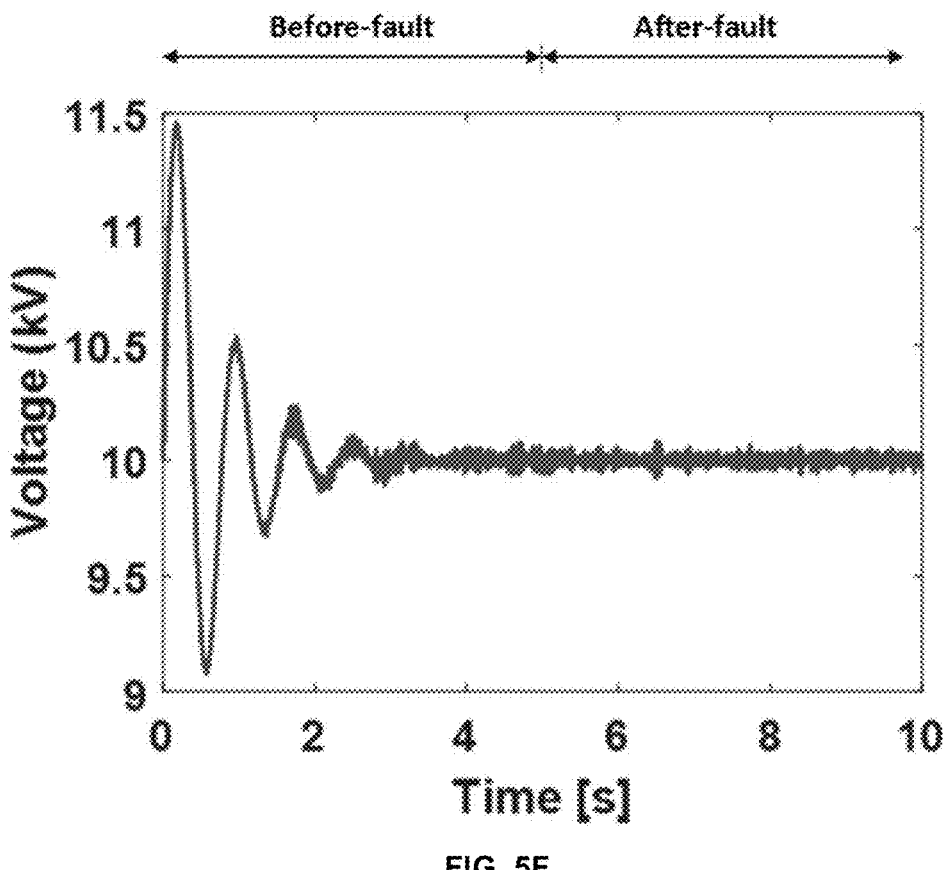

FIG. 5E illustrates the capacitor voltage of a healthy, operating SM≈1.67 kV. FIG. 5F illustrates the DC-bus voltage of approximately 10 kV.

Figure 5G:
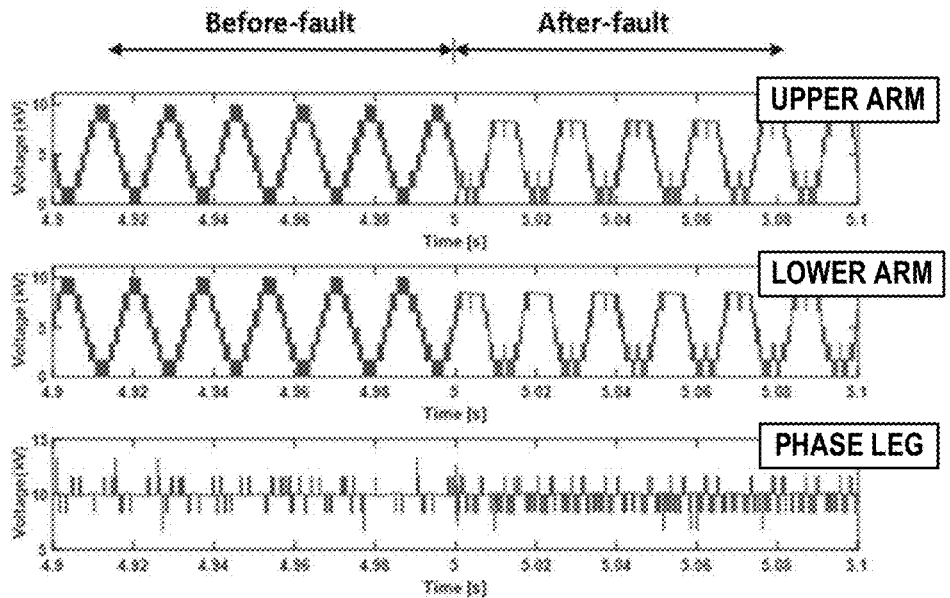
Figure 5H:
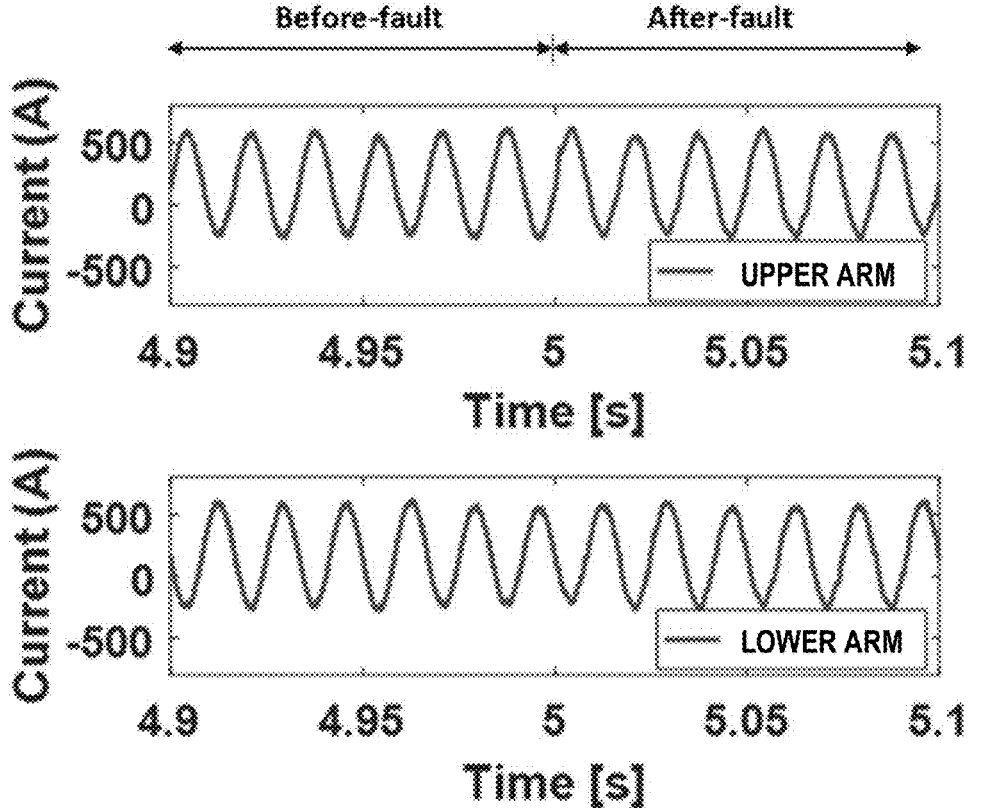

FIG. 5G illustrates the upper arm, lower arm, and total leg voltages of Phase A. As a result of utilizing the fault tolerant techniques described herein, the internal arm voltages change for RUF=0.833 at t=5 s while the leg voltage remains unchanged. FIG. 5H illustrates the upper and lower arm currents of the faulty leg. As can be seen in FIG. 5G, the arm currents remain balanced.

FIG. 6 is a flow diagram illustrating example operations for SM fault tolerance in an MCC, in accordance with one or more aspects of the present disclosure. The example operations of FIG. 6 are described below within the context of FIGS. 1A and 1B. The example operations of FIG. 6 represent only one example of operations for performing the techniques of the present disclosure, and various other or additional operations may be utilized to perform the techniques described herein in other examples.

In the example of FIG. 6, a device having at least one processor may receive an indication of a fault in one or more SMs (602). For example, control module 108, as shown in the example of FIG. 1, may receive an indication of a fault in one instance of SM 106 in arm 104. As one example of the indication, control module 108 may detect a significant voltage drop across the SM capacitor.

In the example of FIG. 6, the device may cause the MMC to bypass an equal number of healthy SMs in the reciprocal arm (604). For example, control module 108 may cause MMC to bypass one healthy instance of SM 106 in the lower arm of phase leg 102.

In the example of FIG. 6, the device may determine a zero-sequence voltage for each phase leg (606). For instance, control module 108 may determine a scaled zero-sequence voltage using equation (2) provided herein.

In the example of FIG. 6, the device may determine, for each phase leg, based at least in part on the zero-sequence voltage, a respective modified phase leg reference signal (608). The device may determine the respective modified phase leg reference signal for the first phase leg further based in part on a reduced utilization factor (RUF) for the first phase leg. For example control module 108 may use the zero-sequence voltage to determine respective modified phase leg reference signals for each phase. Control module 108 may determine the respective modified phase leg reference signal for Phase A based additionally on the RUF for phase leg 102.

In the example of FIG. 6, the device may determine, based on the respective modified phase leg reference signal for each phase leg, gate driver signals for SMs in the MMC (610). For example, control module 108 may use the respective modified phase leg reference signals to determine gate driver signals for SMs 106.

In the example of FIG. 6, the device may cause the MMC to operate using the gate driver signals (612). For example, control module 108 may cause MMC 100 to operate using the generated gate driver signals to switch SMs 106.

The techniques of the present disclosure may additionally or alternatively be described by one or more of the following examples:

Example 1. A device comprising: at least one processor configured to: receive an indication of a fault in one or more submodules (SMs) that are in a first arm of a first phase leg of a modular multilevel converter (MMC); cause the MMC to bypass an equal number of healthy SMs in a second arm of the first phase leg; determine, a zero-sequence voltage for each phase leg; determine, for each phase leg, based at least in part on the zero-sequence voltage, a respective modified phase leg reference signal, the respective modified phase leg reference signal for the first phase leg being determined further based in part on a reduced utilization factor (RUF) for the first phase leg; determine, based on the respective modified phase leg reference signal for each phase leg, gate driver signals for SMs in the MMC; and cause the MMC to operate using the gate driver signals.

Example 2. The device of example 1, wherein the at least one processor is further configured to: determine, based on the number of healthy SMs in the first arm, a reduced carrier phase shifted pulse-width modulation (CPS-PWM) signal for the first leg; and determine the gate driver signals for SMs in the first leg based additionally on the reduced CPS-PWM signal.

Example 3. The device of any of examples 1-2, wherein determining the zero-sequence voltage comprises determining $V_{ZS}=0.5V_{dc}(1-2\sigma)+(1-\sigma)\ V_{min}+0V_{max}$, wherein: $V_{ZS}$ represents the respective zero-sequence voltage; $V_{dc}$ represents the DC link voltage of the MMC; $\sigma$ represents a generalized distribution coefficient; $V_{min}$ represents an instantaneous maximum voltage value; and $V_{max}$ represents an instantaneous minimum voltage value.

Example 4. The device of example 3, wherein $\sigma$ is determined by $$\sigma = \frac{2\left(\dfrac{N-N_{fm}}{N}-0.5\right)+\left(1-m\sqrt{3}\right)}{2-m\sqrt{3}},$$

wherein: N represents the number of SMs in each phase arm; $N_{fm}$ represents the larger of the number of faulty SMs in the first arm or the number of faulty SMs in the second arm; and m represents an original modulation index.

Example 5. The device of example 3, wherein $\sigma$ is selected to be a value between 0 and 1.

Example 6. The device of any of examples 1-5, wherein the at least one processor is further configured to determine the RUF for the first phase leg by determining $$RUF = \frac{N-N_{fm}}{N},$$

wherein: N represents the number of SMs in each phase arm; and $N_{fm}$ represents the larger of the number of faulty SMs in the first arm or the number of faulty SMs in the second arm.

Example 7. The device of any of examples 1-6, wherein the device comprises a control module of the MMC.

Example 8. A method comprising: receiving an indication of a fault in one or more submodules (SMs) that are in a first arm of a first phase leg of a modular multilevel converter (MMC); causing, by a device comprising at least one processor, the MMC to bypass an equal number of healthy SMs in a second arm of the first phase leg; determining, by the device, a zero-sequence voltage; determining, by the device, for each phase leg, and based at least in part on the zero-sequence voltage, a respective modified phase leg reference signal, the respective modified phase leg reference signal for the first phase leg being determined further based in part on a reduced utilization factor (RUF) for the first phase leg; determining, by the device and based on the respective modified phase leg reference signal for each phase leg, gate driver signals for SMs in the MMC; and operating the MMC using the gate driver signals.

Example 9. The method of example 8, further comprising: determining, based on the number of healthy SMs in the first arm, a reduced carrier phase shifted pulse-width modulation (CPS-PWM) signal for the first leg; and determining the gate driver signals for SMs in the first leg based additionally on the reduced CPS-PWM signal.

Example 10. The method of any of examples 8-9, wherein determining the zero-sequence voltage comprises determining $V_{ZS}=0.5V_{dc}(1-2\sigma)+(1-\sigma)\ V_{min}+0V_{max}$, wherein: $V_{ZS}$ represents the respective zero-sequence voltage; $V_{dc}$ represents the DC link voltage of the MMC; $\sigma$ represents a generalized distribution coefficient; $V_{min}$ represents an instantaneous maximum voltage value; and $V_{max}$ represents an instantaneous minimum voltage value.

Example 11. The method of example 10, wherein $\sigma$ is determined by $$\sigma = \frac{2\left(\dfrac{N-N_{fm}}{N}-0.5\right)+\left(1-m\sqrt{3}\right)}{2-m\sqrt{3}},$$

wherein: N represents the number of SMs in each phase arm; $N_{fm}$ represents the larger of the number of faulty SMs in the first arm or the number of faulty SMs in the second arm; and m represents an original modulation index.

Example 12. The method of example 10, wherein σ is selected to be a value between 0 and 1.

Example 13. The method of any of examples 8-12, further comprising determining the RUF for the first phase leg by determining $$RUF = \frac{N - N_{fm}}{N},$$

wherein: N represents the number of SMs in each phase arm; and $N_{fm}$ represents the larger of the number of faulty SMs in the first arm or the number of faulty SMs in the second arm.

Example 14. The method of any of examples 8-13, wherein the device comprises a control module of the MMC.

Example 15. A method performed by a modular multi-level converter (MMC), the method comprising: monitoring operation of the MMC for faults occurring in one or more of a plurality of submodules (SMs) positioned in the MMC; when a faulty SM is detected in a first phase of the MMC, isolating the faulty SM; when the faulty SM is detected in the first phase of the MMC, bypassing a non-faulty SM; a first calculating of a reduced utilization factor (RUF) due to the faulty SM in the first phase; a second calculating of a respective zero-sequence voltage (ZSV) for each phase; and an injecting the ZSV into the phase voltages, resulting in the modifying of a reference signal for each phase ($U_{a\_ref}$, $U_{b\_ref}$, $U_{c\_ref}$), wherein: the MMC comprises a leg comprising a first arm and a complementary arm, and each arm comprises at least one of the plurality of SMs, the faulty SM is positioned in the first arm, the bypassed non-faulty SM is positioned in the complementary arm, the first calculating, the second calculating, and the injecting are performed in a control module of the MMC, and the control module operates the MMC using the modified reference signals, resulting in at least one of a suppression of a circulating current, a balanced leg voltage, a balanced arm current, a stable phase current, or a stable DC-bus current in the MMC.

In one or more examples, the techniques described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and micro-wave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

The techniques described herein should not necessarily be construed as limited to addressing any of the particular problems or deficiencies discussed herein. References in the specification to "one example", "an example", "some examples", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

What is claimed is:

1. A device comprising:
at least one processor configured to:
    receive an indication of a fault in one or more submodules (SMs) that are in a first arm of a first phase leg of a modular multilevel converter (MMC);
    cause the MMC to bypass an equal number of healthy SMs in a second arm of the first phase leg;
    determine, a zero-sequence voltage for each phase leg;
    determine, for each phase leg, based at least in part on the zero-sequence voltage, a respective modified phase leg reference signal, the respective modified phase leg reference signal for the first phase leg being determined further based in part on a reduced utilization factor (RUF) for the first phase leg;
    determine, based on the respective modified phase leg reference signal for each phase leg, gate driver signals for SMs in the MMC; and
    cause the MMC to operate using the gate driver signals.

2. The device of claim 1, wherein the at least one processor is further configured to:
    determine, based on the number of healthy SMs in the first arm, a reduced carrier phase shifted pulse-width modulation (CPS-PWM) signal for the first leg; and
    determine the gate driver signals for SMs in the first leg based additionally on the reduced CPS-PWM signal.

3. The device of claim 1, wherein determining the zero-sequence voltage comprises determining $V_{ZS}=0.5V_{dc}(1-2\sigma)+(1-\sigma)V_{min}+0V_{max}$, wherein:
    $V_{zs}$ represents the respective zero-sequence voltage;
    $V_{dc}$ represents the DC link voltage of the MMC;
    $\sigma$ represents a generalized distribution coefficient;
    $V_{min}$ represents an instantaneous maximum voltage value; and
    $V_{max}$ represents an instantaneous minimum voltage value.

4. The device of claim 3, wherein $\sigma$ is determined by $$\sigma = \frac{2\left(\frac{N-N_{fm}}{N}-0.5\right)+\left(1-m\sqrt{3}\right)}{2-m\sqrt{3}},$$

wherein:
    N represents the number of SMs in each phase arm;
    $N_{fm}$ represents the larger of the number of faulty SMs in the first arm or the number of faulty SMs in the second arm; and
    m represents an original modulation index.

5. The device of claim 3, wherein $\sigma$ is selected to be a value between 0 and 1.

6. The device of claim 1, wherein the at least one processor is further configured to determine the RUF for the first phase leg by determining $$RUF = \frac{N-N_{fm}}{N},$$

wherein:
    N represents the number of SMs in each phase arm; and
    $N_{fm}$ represents the larger of the number of faulty SMs in the first arm or the number of faulty SMs in the second arm.

7. The device of claim 1, wherein the device comprises a control module of the MMC.

8. A method comprising:
receiving an indication of a fault in one or more submodules (SMs) that are in a first arm of a first phase leg of a modular multilevel converter (MMC);
causing, by a device comprising at least one processor, the MMC to bypass an equal number of healthy SMs in a second arm of the first phase leg;
determining, by the device, a zero-sequence voltage;
determining, by the device, for each phase leg, and based at least in part on the zero-sequence voltage, a respective modified phase leg reference signal, the respective modified phase leg reference signal for the first phase leg being determined further based in part on a reduced utilization factor (RUF) for the first phase leg;
determining, by the device and based on the respective modified phase leg reference signal for each phase leg, gate driver signals for SMs in the MMC; and
operating the MMC using the gate driver signals.

9. The method of claim 8, further comprising:
determining, based on the number of healthy SMs in the first arm, a reduced carrier phase shifted pulse-width modulation (CPS-PWM) signal for the first leg; and
determining the gate driver signals for SMs in the first leg based additionally on the reduced CPS-PWM signal.

10. The method of claim 8, wherein determining the zero-sequence voltage comprises determining $V_{ZS}=0.5V_{dc}(1-2\sigma)+(1-\sigma)V_{min}+0V_{max}$, wherein:
    $V_{ZS}$ represents the respective zero-sequence voltage;
    $V_{dc}$ represents the DC link voltage of the MMC;
    $\sigma$ represents a generalized distribution coefficient;
    $V_{min}$ represents an instantaneous maximum voltage value; and
    $V_{max}$ represents an instantaneous minimum voltage value.

11. The method of claim 10, wherein σ is determined by $$\sigma = \frac{2\left(\dfrac{N-N_{fm}}{N}-0.5\right)+\left(1-m\sqrt{3}\right)}{2-m\sqrt{3}},$$

wherein:

N represents the number of SMs in each phase arm;

$N_{fm}$ represents the larger of the number of faulty SMs in the first arm or the number of faulty SMs in the second arm; and m represents an original modulation index.

12. The method of claim 10, wherein σ is selected to be a value between 0 and 1.

13. The method of claim 8, further comprising determining the RUF for the first phase leg by determining $$RUF = \frac{N-N_{fm}}{N},$$

wherein:

N represents the number of SMs in each phase arm; and $N_{fm}$ represents the larger of the number of faulty SMs in the first arm or the number of faulty SMs in the second arm.

14. The method of claim 8, wherein the device comprises a control module of the MMC.

15. A method performed by a modular multilevel converter (MMC), the method comprising:

monitoring operation of the MMC for faults occurring in one or more of a plurality of submodules (SMs) positioned in the MMC;

when a faulty SM is detected in a first phase of the MMC, isolating the faulty SM;

when the faulty SM is detected in the first phase of the MMC, bypassing a non-faulty SM;

a first calculating of a reduced utilization factor (RUF) due to the faulty SM in the first phase;

a second calculating of a respective zero-sequence voltage (ZSV) for each phase; and an injecting the ZSV into the phase voltages, resulting in the modifying of a reference signal for each phase ($U_{a\_ref}$, $U_{b\_ref}$, $U_{c\_ref}$), wherein:

the MMC comprises a leg comprising a first arm and a complementary arm, and each arm comprises at least one of the plurality of SMs, the faulty SM is positioned in the first arm, the bypassed non-faulty SM is positioned in the complementary arm, the first calculating, the second calculating, and the injecting are performed in a control module of the MMC, and the control module operates the MMC using the modified reference signals, resulting in at least one of a suppression of a circulating current, a balanced leg voltage, a balanced arm current, a stable phase current, or a stable DC-bus current in the MMC.

\* \* \* \* \*